United States Patent
Peterson et al.

(10) Patent No.: US 7,304,714 B2
(45) Date of Patent: Dec. 4, 2007

(54) USE OF OPTICAL SENSOR IN MOTION PICTURE FILM PROJECTOR LAMPHOUSE TO DETECT STATE OF PROJECTOR TO PREVENT INTERRUPTION OF FEATURE FILM PRESENTATION BY KODAK DIGITAL CINEMA SYSTEM DESIGNED FOR CINEMA ADVERTISING

(75) Inventors: Gary L. Peterson, Rochester, NY (US);
Leslie G. Moore, Webster, NY (US);
William A. Orfitelli, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 394 days.

(21) Appl. No.: 11/014,799

(22) Filed: Dec. 15, 2004

(65) Prior Publication Data

US 2005/0168694 A1    Aug. 4, 2005

Related U.S. Application Data

(60) Provisional application No. 60/540,985, filed on Feb. 2, 2004.

(51) Int. Cl.
*G03B 21/32* (2006.01)
(52) U.S. Cl. .......................... 352/133; 352/40; 352/92; 353/122
(58) Field of Classification Search .................. 352/38, 352/40, 90, 133, 135, 85; 353/122; 345/716, 345/772, 835; 725/74, 78; 369/59
See application file for complete search history.

(56) References Cited

U.S. PATENT DOCUMENTS

| | | | | |
|---|---|---|---|---|
| 5,544,140 | A   * | 8/1996  | Seagrave et al. | 369/59.21 |
| 6,384,893 | B1  * | 5/2002  | Mercs et al.    | 352/133   |
| 6,587,159 | B1  * | 7/2003  | Dewald          | 348/744   |
| 6,741,323 | B2  * | 5/2004  | Plunkett        | 352/90    |
| 6,771,349 | B2  * | 8/2004  | Sitrick et al.  | 352/85    |
| 6,809,792 | B1  * | 10/2004 | Tehranchi et al.| 352/85    |
| 6,812,994 | B2  * | 11/2004 | Bubie et al.    | 352/40    |
| 6,912,039 | B2  * | 6/2005  | Patton et al.   | 352/38    |
| 2002/0069107 | A1 | 6/2002 | Werner | |
| 2004/0158865 | A1 * | 8/2004 | Kubler et al. | 725/82 |
| 2004/0252280 | A1 | 12/2004 | Paige et al. | |

FOREIGN PATENT DOCUMENTS

FR    2808955    11/2002
JP    2001-075177    3/2001

* cited by examiner

*Primary Examiner*—Sang H. Nguyen
(74) *Attorney, Agent, or Firm*—Peyton C. Watkins; Stephen H. Shaw

(57) ABSTRACT

A system that determines a projector's true state in an automatic projection sequence. The system includes a projector in a primary display system, having a lamp for displaying visual information; and a sensor to determine the state of the lamp in the primary display system. Additionally, an interface to a secondary display system is included for sending an operational signal to the secondary display system, wherein the secondary display system operates subject to a predetermined state of the primary display system as determined by the state of the lamp in the primary display system.

10 Claims, 2 Drawing Sheets

USE OF OPTICAL SENSOR IN MOTION PICTURE FILM PROJECTOR LAMPHOUSE TO DETECT STATE OF PROJECTOR TO PREVENT INTERRUPTION OF FEATURE FILM PRESENTATION BY KODAK DIGITAL CINEMA SYSTEM DESIGNED FOR CINEMA ADVERTISING

CROSS-REFERENCE TO RELATED APPLICATION(S)

Reference is made to commonly assigned copending provisional application Ser. No. 60/540,985, filed Feb. 2, 2004, entitled "Pre-Show Content Fail-Safe System" and filed in the names of Leslie G. Moore, Gary L. Peterson, William A Orfitelli, and Matthew J. Bielaska, which are assigned to the assignee of this application.

FIELD OF THE INVENTION

The invention relates generally to the field of Digital Cinema, and in particular to Digital Cinema Systems for cinema advertising. More specifically, the invention relates to switching between an advertising digital projector and a feature projector based on a pre-determined state of the feature projector.

BACKGROUND OF THE INVENTION

The Kodak Digital Cinema System, designed for cinema advertising, is a network of high-quality servers, digital projectors, and software that enables the advertising to load and display on the screens without any operator involvement. Through this unique software, Kodak's operating system is connected to the theater's automation, as well as to its ticketing systems. At the present time, the system is used to show advertising prior to the start of the feature film. The feature film is either shown using a traditional motion picture film projector or a digital projector.

The Kodak Digital Advertising Cinema Operating System (ACOS)™ utilizes an automation interface that operates as a communication interface between the theater automation equipment and the ACOS Content Player (CP). Signals from the Automation Interface allows status information to be communicated from the feature projector so that the CP knows when it is suitable to play the pre-show content.

There are many different automation systems used in the industry today. This variation in equipment prevents a "typical" connection between the automation interface and the automation of the feature projector. The particular feature projector automation system and the workflow in the projection booth determine the connection required. To allow for proper operation, the CP is required to know the status of the feature projector to prevent the digital pre-show from playing at inappropriate times. If the feature projector is on, the ACOS system is preferably off. If the feature projector is off, the ACOS system can show content as scheduled. The ACOS automation interface should be able to accommodate any workflow that the projectionist would use in the operation of the feature projector. This could be automatically through the automation system or manually without the automation system. In the event that the projectionist must operate the projector manually, normal automation status signals will not be received by the automation interface. This could potentially allow the advertising projector and feature projector to be showing content at the same time, thus ruining the theatrical experience for viewers.

SUMMARY OF THE INVENTION

The present invention is directed to overcoming one or more of the problems set forth above. Briefly summarized, one aspect of the present invention is a system that determines a projector's true state in an automatic projection sequence. The system includes a projector in a primary display system, having a lamp for displaying visual information; and a sensor to determine the state of the lamp in the primary display system. Additionally, an interface to a secondary display system is included for sending an operational signal to the secondary display system; wherein the secondary display system operates subject to a predetermined state of the primary display system as determined by the state of the lamp in the primary display system.

These and other aspects, features and advantages of the present invention will be more clearly understood and appreciated from a review of the following detailed description of the preferred embodiments and appended claims, and by reference to the accompanying drawings.

DETAILED DESCRIPTION OF THE INVENTION

The present invention provides a means to interrupt automated and manual programming and insure that no disruption occurs, when the feature projectors are projecting images. An optical failsafe device is designed as a redundant input to the ACOS automation interface to provide feature projector status to the CP. The optical failsafe device monitors the lamp of the feature projector and senses whether the lamp is on and provides an input to the automation interface that is used as a "Stop" signal for the ACOS. This input has precedence over the other automation input signals that the automation interface receives. This signal remains active for the duration of time that the lamp is on and prevents the automation interface from responding to any other automation signal.

The failsafe sensor is a photologic optical sensor that is mounted inside the lamphouse. It has very high sensitivity, which allows for a variety of mounting locations to accommodate different models of lamphouses. It senses the internal reflected light from the lamp. It is not located in the direct light path of the lamp, thereby eliminating the potential for image quality issues.

Figure 1:
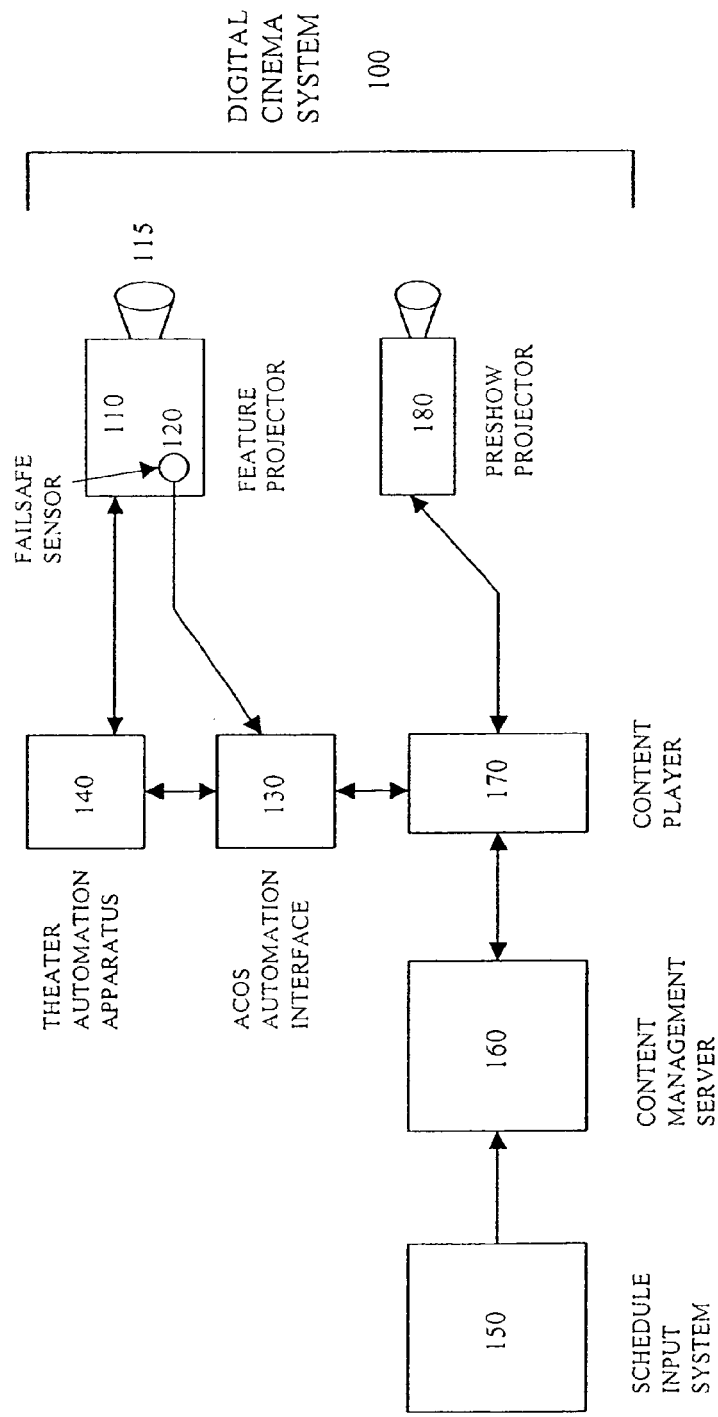
FIG. 1 is a typical connection utilizing the failsafe detector and the theater automation apparatus to provide feature projector status to the ACOS Automation Interface.

As shown in FIG. 1 according to one embodiment of a digital cinema system 100, a failsafe sensor 120 is added to a feature projector 110 so that an advertising system automation interface 130 can determine whether or not the feature projector's lamp 115 is on. The state of the feature projector lamp 115 may alternatively be off, hot or cold, blocked or unblocked and may be monitored as such. The failsafe sensor 120 may, for example, be an optical sensor, a temperature sensor, a proximity sensor, or a limit switch. The digital cinema system 100 further includes a theatre automation apparatus 140 for sending interface signals to the feature projector 110 and the advertising system automation interface 130. The advertising system automation interface 130 may, for example, be an input/output (I/O) box, an I/O card, or merely a hardwired connection. A content management server 160 receives scheduling information from schedule input system 150 before interacting with and controlling a content player 170. The content player 170 has advertising information or other non-feature information that will be displayed by preshow projector 180. Preshow advertising may be shown by the preshow projector 180, but so can other content that is distinct from the feature presentation, for example, political information, community service information, exhibition-related ordering information, and theater operational information. Should the feature projector lamp 115 be on, the preshow advertising is inhibited to prevent the normal operating schedule.

Figure 2:
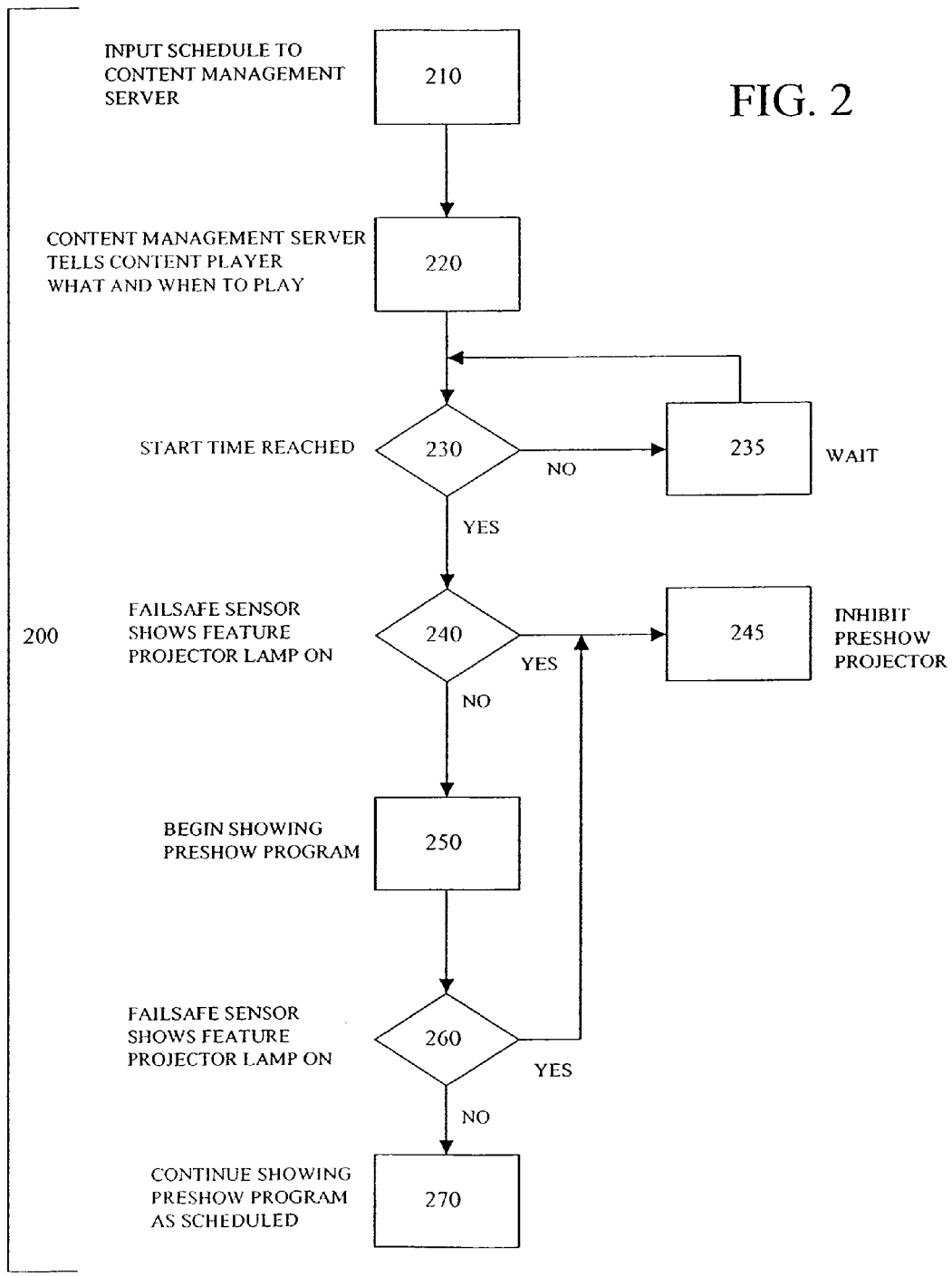
FIG. 2 is a flow diagram showing how the failsafe signal is monitored.

FIG. 2 is a flow diagram 200 showing that the fail-safe signal provided by the failsafe sensor 120 (shown in FIG. 1) is monitored. Operation 210 sends the input schedule to the content management server. Operation 220 has the content management server tell the content player what and when to play content. Operation 230 decides whether the start time for the cinema has been reached. If the start time had not been reached operation 235 causes the system to wait. Otherwise, operation 240 decides whether a failsafe sensor shows that the feature projection lamp is on. If the feature projection lamp 115 (shown in FIG. 1) is on, operation 245 will inhibit the preshow projector 180. If the feature projector lamp 115 is not on, then operation 250 will begin showing the preshow advertising program/content. Operation 260 decides whether the failsafe shows the feature projector lamp on during the showing of preshow advertising program/content. If the feature projection lamp is on, operation 245 will inhibit the preshow projector. Otherwise operation 270 will continue showing preshow advertising program/content.

Thus, if the fail-safe signal shows that the feature projector lamp is on, the preshow projector is inhibited. Alternative embodiments may employ other fail-safe signals that show the feature projector in different states of operation other than having the feature projector lamp on; e.g., monitoring increased voltage and/or current usage of the feature projector, or monitoring ambient condition of the projection room/booth.

Depending on the automation system, circuits such as slide projector relay, exciter lamp, changeover open/close and start/stop cues can be monitored to interpret the current state of the feature projector.

This fail-safe sensor method also protects against possible problems that might occur if the advertising system automation interface has the incorrect time or is otherwise in an incorrect state. One embodiment of the present invention is implemented with an optical sensor within the feature projector to insure that the automation system knows the current state of the devices within the theater.

The invention has been described with reference to a preferred embodiment. However, it will be appreciated that variations and modifications can be effected by a person of ordinary skill in the art without departing from the scope of the invention.

PARTS LIST 100 digital cinema system
110 feature projector
115 feature projector lamp
120 failsafe sensor
130 advertising system automation interface
140 theatre automation apparatus
150 schedule input system
160 content management server
170 content player
180 preshow projector
200 flowchart
210 operation
220 operation
230 operation
235 operation
240 operation
245 operation
250 operation
260 operation
270 operation

What is claimed is:

1. A system to determine a projector's true state in an automatic projection sequence, comprising:
   a) a first projector having a lamp for displaying visual information;
   b) a sensor to determine the state of the lamp in the first projector;
   c) a second projector for displaying preshow advertising; and
   d) an interface to the second projector for sending an operational signal to the second projector; wherein the second projector operates subject to a predetermined state of the first projector as determined by the state of the lamp in the first projector.

2. The system claimed in claim 1, wherein the interface to the second projector is selected from the group consisting of I/O box, I/O card or hardwired connection.

3. The system claimed in claim 1, wherein the sensor is selected from the group consisting of an optical sensor, a temperature sensor, a proximity sensor, limit switch.

4. The system claimed in claim 1, wherein the state of the lamp is either on or off, hot or cold, blocked or unblocked.

5. The system claimed in claim 1, wherein the second projector comprises:
   a) a digital projector; and
   the system further comprises:
   b) a content player for providing display information to the second projector.

6. The system claimed in claim 1, wherein the second projector comprises:
   a) a digital projector, and
   the system further comprises:
   b) a content player for providing display information to the digital projector; and
   c) a content management server for controlling the content player.

7. The system claimed in claim 1, wherein the second projector comprises:
   a) a digital projector; and
   the system further comprises:
   b) a content player for providing display information to the digital projector;
   c) a content management server for controlling the content player; and
   d) a schedule input system for providing scheduling information to the content management server.

8. The system as in claim 1, wherein the second projector is a digital projector.

9. A system to determine a projector's true state in an automatic projection sequence, comprising:
   a) a plurality of first projectors having a lamp, residing in a lamphouse, for displaying visual information;

b) a sensor in each lamphouse to determine the state of the lamp in each of the plurality of projectors;
c) a second projector for displaying preshow advertising; and
d) an interface to the second projector for sending an operational signal to the second projector, wherein the second projector operates subject to a predetermined state of the first projector as determined by the state of the lamps corresponding to each of the plurality of first projectors.

10. The system as in claim 9, wherein the second projector is a digital projector.

* * * * *